US005684078A

United States Patent [19]

Pfaffenschlager et al.

[11] Patent Number: 5,684,078
[45] Date of Patent: Nov. 4, 1997

[54] POLYMER AND USE OF THE POLYMER AS GRINDING AND DISPERSING RESIN AND BINDER FOR PAINT

[75] Inventors: Arthur Pfaffenschlager; Antonio Manoel Marques Pereira; Wilson Marques Canabrava, all of Sao Paulo, Brazil

[73] Assignee: BASF Lacke +Farben, AG, Muenster-Hiltrup, Germany

[21] Appl. No.: 211,563

[22] PCT Filed: Oct. 2, 1992

[86] PCT No.: PCT/EP92/02282

§ 371 Date: Mar. 28, 1995

§ 102(e) Date: Mar. 28, 1995

[87] PCT Pub. No.: WO93/07191

PCT Pub. Date: Apr. 15, 1993

[30] Foreign Application Priority Data

Oct. 10, 1991 [BR] Brazil ..................... 9104402

[51] Int. Cl.$^6$ .................... C08F 2/24; C08L 31/02; C08L 33/24
[52] U.S. Cl. ............ 524/457; 523/201; 524/458; 524/460; 524/521; 524/522; 524/533; 525/902
[58] Field of Search ............ 523/201; 524/457, 524/458, 460, 533, 521, 522; 525/902

[56] References Cited

U.S. PATENT DOCUMENTS

| 3,389,110 | 6/1968 | Taft | 524/460 |
| 4,150,005 | 4/1979 | Gehman et al. | 524/460 |
| 4,277,384 | 7/1981 | Arkens | 525/902 |
| 4,351,875 | 9/1982 | Arkens | 523/201 |
| 5,356,956 | 10/1994 | Uemae et al. | 524/460 |
| 5,405,879 | 4/1995 | Uemae et al. | 524/460 |

Primary Examiner—Peter A. Szekely
Attorney, Agent, or Firm—Anne Gerry Sabourin

[57] ABSTRACT

The present invention relates to water-dilutable emulsion polymers prepared by multistep emulsion polymerization. To this end, (a1) 0.5 to 5.0% by weight of ethylenically unsaturated monomers containing carboxyl groups, and (a2) from 0.5 to 2.5% by weight of olefinically unsaturated carboxamides, where a total of from 1.0 to 8.0% by weight of hydrophilic ionic and hydrophilic nonionic olefinically unsaturated monomers are employed, and (b) from 92.0 to 99.0% by weight of further ethylenically unsaturated monomers containing no further functional groups, are polymerized in the first step of the emulsion polymerization, where the total amount of monomers in the first step is 100% by weight, and exclusively olefinically unsaturated monomers containing no further functional groups are polymerized in the second step of the emulsion polymerization, and the weight ratio between the monomers polymerized in the first step and the monomers polymerized in the second step is from 30–80%:20–70% by weight.

The emulsion polymers are preferably used for the grinding resin for pigments, dispersion resins and as binders in physically drying aqueous lacquers for metallic surfaces, wood and mineral substrates.

11 Claims, No Drawings

POLYMER AND USE OF THE POLYMER AS GRINDING AND DISPERSING RESIN AND BINDER FOR PAINT

This application is a 371 of PCT/EP92/02282, Oct, 2, 1992.

The invention relates to a water-dilutable emulsion polymer which is prepared by multistep emulsion polymerization of ethylenically unsaturated monomers in the aqueous phase in the presence of an emulsifier or a plurality of emulsifiers and in the presence of one or more free radical-forming initiators, where the first step of the emulsion polymerization involves polymerization of ethylenically unsaturated monomers containing carboxyl groups and amide groups, and the second step of the emulsion polymerization involves polymerization of ethylenically unsaturated monomers containing no further functional groups in the presence of the emulsion polymer prepared in the first step.

The invention furthermore relates to a process for the preparation of the water-dilutable emulsion polymer, to a coating composition based on the emulsion polymer, and to the use thereof.

Primary dispersions have proven unusable for use as grinding resins in pigment pastes due to the high mechanical load in grinding processes, since the primary dispersions frequently coagulate during grinding. In addition, primary dispersions are generally inferior in pigment wettability to solvent-containing coating compositions based on alkyd resins, acrylate resins and epoxy ester resins, and to known mixtures of water-soluble alkyd resins and secondary dispersions based on polyacrylates.

Emulsion polymers prepared by multistep emulsion polymerization are known. Thus, for example, EP A-332 011 discloses polymers formed by stepwise emulsion polymerization in the presence of conventional water-soluble free radical-forming polymerization initiators and conventional emulsifiers, where the first and second emulsion steps involve polymerization of, inter alia, olefinically unsaturated carboxylic acids. According to EP-A-332 011, the resultant dispersions are employed in wood paints. However, they are unsuitable as grinding resins for pigment pastes, since paints based on the emulsions described generally coagulate immediately after the pigment grinding.

U.S. Pat. No. 4,150,005 relates to two-step emulsion polymers prepared by polymerizing, in a first step, at least 10% by weight, based on the total weight of the monomers in the first step, of hydrophilic monomers, more precisely hydrophilic ionic monomers and non-ionic hydrophilic monomers, such as acrylamides or hydroxyalkyl esters of α,β-unsaturated acids. In the second step of the emulsion polymerization, monomers containing no further functional groups, such as, for example, methyl methacrylate and styrene, are used. The polymer latices formed can be used as coating compositions, adhesives and binders, for example for coating floors. The emulsions disclosed in U.S. Pat. No. 4,150,005 are suitable for grinding processes, but their pigment wetting capacity is inadequate. This has the consequence that the gloss of the paints prepared from them is in great need of improvement and the coating compositions can only be employed for matt finishes. In addition, the coating compositions disclosed in U.S. Pat. No. 4,150,005 are unsuitable for coating metal substrates, since the adhesion to the substrate is inadequate and the coating compositions are in need of improvement with respect to elasticity.

The object of the invention was to develop aqueous coating compositions which have good pigment wetting capacity and can thus be employed as grinding resins for pigment pastes. In addition, the dispersions should be suitable for grinding processes and should be suitable as binders for physically drying coating compositions. They should be suitable as binders in coating compositions, in particular for metallic substrates, wood and mineral substrates.

The object of the application is achieved by water-dilutable emulsion polymers of the type mentioned at the outset, which are characterized in that (a1) 0.5 to 5.0% by weight, preferably from 1.0 to 3.0% by weight, of ethylenically unsaturated monomers containing carboxyl groups, and (a2) from 0.5 to 2.5% by weight, preferably from 1.0 to 2.0% by weight, of olefinically unsaturated carboxamides, where a total of from 1.0 to 8.0% by weight, preferably from 2.0 to 5.0% by weight, of hydrophilic ionic and hydrophilic nonionic olefinically unsaturated monomers are employed, and (b) from 92.0 to 99.0% by weight, preferably from 95.0 to 98.0% by weight, of further ethylenically unsaturated monomers which are copolymerizable with the above-mentioned hydrophilic ethylenically unsaturated monomers and contain no further functional groups, are polymerized in the first step of the emulsion polymerization, where the total amount of monomers in the first step is 100% by weight, and exclusively olefinically unsaturated monomers containing no further functional groups are polymerized in the second step of the emulsion polymerization, and the weight ratio between the monomers polymerized in the first step and the monomers polymerized in the second step is from 30–80%:20–70% by weight.

The present invention also relates to a process for the preparation of the abovementioned water-dilutable emulsion polymers, in which the emulsion polymerization is carried out at temperatures in the range between 20° C. to 100° C., preferably in the range from 80° C. to 95° C.

The emulsion polymers according to the invention are prepared by emulsion polymerization in two or more steps in aqueous medium in known apparatuses, for example in a stirred reactor with heating and cooling devices.

The monomers can be added by initially introducing a solution of all the water, the emulsifier and some of the initiator into the reactor and slowly adding the monomer or the monomer mixture and separately, but in parallel, the remainder of the initiator at the polymerization temperature. However, it is preferred to initially introduce some of the water and some of the emulsifier into the reactor and to prepare a pre-emulsion from the remainder of the water and the remainder of the emulsifier and the monomer mixture and to add this pre-emulsion slowly at the polymerization temperature, the initiator again being added separately. It is also possible to add the monomer mixture in the first step in the form of a pre-emulsion, and to add the monomer or monomer mixture as such, i.e. without water and emulsifier, and the initiator separately, but in parallel, in the second step.

The polymerization temperature is in the range from 20° C. to 100° C., preferably in the range from 80° C. to 95° C.

The mixing ratio between the monomers and the water can be selected so that the resultant dispersion has a solids content of from 30 to 60% by weight, preferably from 35 to 55% by weight.

Emulsifiers which can be used are anionic and/or nonionic emulsifiers. Examples of anionic emulsifiers are alkaline metal salts or ammonium salts of sulfuric acid monoesters of alkylphenols or of alcohols, furthermore sulfuric acid monoesters of oxyethylated alkylphenols or oxyethylated alcohols. Preference is given to alkali metal salts of sulfuric acid monoesters of nonylphenol which has been reacted with 23 mol of ethylene oxide per mol, alkyl or aryl sulfonate, sodium lauryl sulfate, sodium lauryl ethoxylate sulfate and the alkali metal salt of diesters of sulfur succinate acid with alcohols having 6 to 20 carbon atoms. The preferred nonionic emulsifiers are ethers of nonylphenols which have been reacted with 5 to 23 mol of ethylene oxide.

Suitable initiators for the emulsion polymerization are conventional inorganic peroxodisulfates, preferably potassium peroxodisulfate and ammonium peroxodisulfate, and ammonium or alkali metal peroxydiphosphates. It is also possible to employ redox initiators, for example hydrogen peroxide, benzoyl peroxide, organic peresters, such as hexperisopivalate, in combination with water-soluble reducing agents, such as, for example, ascorbic acid, sulfur compounds, triethylamine, sodium disulfite, hydrazine, hydroxylamine, glycolic acid and tartaric acid. The initiators are water- or monomer-soluble.

It is preferred to carry out the emulsion polymerization in the presence of regulators, for example mercaptans or polyhalogen compounds. The regulators are preferably employed in all steps of the emulsion polymerization.

Examples of suitable monomers (a1) containing carboxyl groups are acrylic acid, methacrylic acid, maleic acid, maleic anhydride, fumaric acid and itaconic acid. Acrylic acid and methacrylic acid are particularly suitable.

Suitable olefinically unsaturated carboxamides (a2) are alkylamides and substituted alkylamides of acrylic acid and methacrylic acid, monoamides and diamides of maleic, fumaric and itaconic acid, acrylamides, methacrylamides, alkoxyalkylacrylamides, alkoxyalkylmethacrylamides and N-methylolacrylamides. Examples which may be mentioned are: acrylamide, methacrylamide, di-N-methylacrylamide, diacetoneacrylamide, N-isopropylacrylamide, N-isopropylmethacrylamide, N-tert-butylacrylamide, N-tert-octylacrylamide, butoxymethylacrylamide and butoxymethyl-methacrylamide.

In total, from 1.0 to 8.0% by weight, preferably from 2.0 to 5.0% by weight, of hydrophilic ionic and hydrophilic nonionic monomers, based on the total weight of monomers employed in the first step of the emulsion polymerization, are polymerized according to the invention in the first step of the emulsion polymerization. Hydrophilic ionic monomers are taken to mean the monomers containing carboxyl groups which are used as component (a1), whereas hydrophilic nonionic monomers are taken to mean the unsaturated carboxamides and hydroxyalkyl esters of $\alpha,\beta$-unsaturated carboxylic acids which can be employed as component (a2). Examples which are mentioned of monomers containing OH groups are: 2-hydroxyethyl acrylate, 2-hydroxypropyl acrylate, 3-hydroxypropyl acrylate, 2-hydroxypropyl methacrylate, 3-hydroxypropyl methacrylate, 2-hydroxyethyl methacrylate, 4-hydroxybutyl acrylate, 4-hydroxybutyl methacrylate, 6-hydroxyehexyl acrylate, p-hydroxycyclohexyl acrylate, p-hydroxycyclohexyl acrylate, hydroxypolyethylene glycol acrylate, hydroxypolyethylene glycol methacrylate, hydroxypolypropylene glycol acrylate, hydroxypolypropylene glycol methacrylate etc. In total, a maximum of 7% by weight of hydroxyalkyl esters of $\alpha,\beta$-unsaturated acids, based on the total weight of the monomers in the first step, are used in the first step of the emulsion polymerization.

Examples which may be mentioned of suitable polymers (b) which are copolymerizable with the hydrophilic, ethylenically unsaturated monomers and contain no further functional groups are vinylaromatic hydrocarbons, such as styrene, $\alpha$-methylstyrene and vinyltoluene, vinyl acetate, esters of acrylic acid or methacrylic acid, in particular aliphatic and cycloaliphatic acrylates or methacrylates having up to 20 carbon atoms in the alcohol radical, such as, for example, methyl, ethyl, propyl, butyl, hexyl, ethylhexyl, stearyl, lauryl and cyclohexyl acrylate or methacrylate.

As component (b), up to 2.0% by weight, based on the total weight of the monomers in the first step, of polyethylenically unsaturated monomers are advantageously used in the first step of the emulsion polymerization. Examples of these which may be mentioned are allyl esters of unsaturated carboxylic acids, such as, for example, allyl methacrylate, diallyl maleate, diallyl esters of polybasic carboxylic acids, such as diallyl phthalate and hexanediol diacrylate, hexanediol dimethacrylate, glycol diacrylate, glycol dimethacrylate, butanediol diacrylate, butanediol dimethacrylate, trimethylolpropane triacrylate, trimethylolpropane trimethacrylate and divinylbenzene. Preference is given to allyl methacrylate.

In the second step of the emulsion polymerization, exclusively olefinically unsaturated monomers containing no further functional groups are reacted in the presence of the polymer formed in the first step of the emulsion polymerization. Examples which may be mentioned of monomers which can be employed in the second step of the emulsion polymerization are: vinylaromatic hydrocarbons, such as styrene, $\alpha$-methylstyrene, vinyltoluene, vinyl acetate, esters of acrylic or methacrylic acid, in particular aliphatic and cyloaliphatic acrylates or methacrylates having up to 20 carbon atoms in the alkyl radical, for example methyl acrylate, methyl methacrylate, ethyl acrylate, ethyl methacrylate, propyl acrylate, propyl methacrylate, butyl acrylate, butyl methacrylate, hexyl acrylate, hexyl methacrylate, ethylhexyl acrylate, stearyl acrylate, stearyl methacrylate, lauryl acrylate, lauryl methacrylate, cyclohexyl acrylate and cyclohexyl methacrylate.

Monomers containing no further functional groups are taken to mean monomers which are essentially free from functional groups, such as hydroxyl, carboxyl and amide groups. However, this does not exclude the monomers employed containing small amounts (for example due to contamination) of hydroxyl or acid groups.

The weight ratio between the monomers employed in the first step and the monomers employed in the second step of the emulsion polymerization is from 30–80% by weight: 20–70% by weight.

Particularly good properties of the emulsion polymer or of the coating compositions or grinding resins prepared therefrom are achieved if the first step of the emulsion polymerization is carried out using mixtures of acrylic acid, acylamide, styrene, n-butyl acrylate and methyl methacrylate and if the second step of the emulsion polymerization is carried out using n-butyl acrylate and styrene.

A further embodiment of the present invention comprises following the second emulsion polymerization step by one or more further polymerization steps. It is essential to the invention in all cases that exclusively olefinically unsaturated monomers containing no further functional groups are employed in this further step or in these further polymerization steps. The weight ratio between the monomers in the first polymerization step and the total weight of the monomers polymerized in the subsequent polymerization steps is in these cases in the range from 20–80% by weight: 20–80% by weight.

The emulsions obtained according to the invention by multistep emulsion polymerization are neutralized by means of ammonia and/or amines, advantageously in the form of an aqueous solution of the neutralizer. Suitable neutralizers are $NH_3$, alkylamines, such as, for example, diethylamine, triethylamine or N-methylmorpholine, or alkanolamines, such as, for example dimethylethanolamine.

The emulsions prepared have particle sizes in the range from 150 to 450 nm, advantageously in the range from 180 to 240 nm (ultracentrifuge). The particle size distribution is characterized in that at least 85% of the particles have a maximum particle size ratio (weight ratio) (D 90-D10)/D50 of 0.13 (ultracentrifuge). In the density gradient run $H_2O/D_2O$ (ultracentrifuge), the particles have a strictly uniform particle density.

The emulsions prepared can, if desired, be further diluted with conventional organic solvents so that they generally achieve a solids content of from 15 to 45% by weight.

The invention also relates to coating compositions which contain, as film-forming binder, the water-dilutable, neutralized emulsion polymers described above. The coating compositions contain conventional fillers and modifiers and, if desired, organic solvents and pigments. Modifiers which may be mentioned are flow-control agents and thickeners. Examples of suitable fillers are kaolin, talc, mica, quartz, sand and barium sulfate.

Examples of suitable pigments are carbon black, iron oxide, chromium oxide, titanium dioxide, lead chromate and strontium chromate. It is also possible to employ metal pigments and coloring organic-based pigments.

The coating compositions may additionally contain conventional organic solvents in amounts of from 2 to 10% by weight, based on the total weight of the composition. Examples of suitable organic solvents are alcohols, in particular glycol ethers.

Modifiers which can be employed are, depending on the application of the emulsions, thickeners, flow-control agents and if necessary, UV absorbers. Examples of suitable thickeners are pyrogenic silicon dioxide, modified aluminum silicates, hydrogenated castor oil, aluminum stearate and compounds containing polyamide structures. Suitable flow-control agents are high-boiling solvents, silicone oils and soft resins having good compatibility.

The emulsions according to the invention prepared in more than one step can easily be dispersed or ground using dispersion equipment, such as dissolvers, compounders, stirred mills, ball mills and bead mills, without coagulation occurring. They are therefore suitable as dispersion and grinding resins in dispersion and grinding processes. The present invention therefore relates to the use of the water-dilutable multistep polymer emulsions as dispersion resins or grinding resins in dispersion or grinding operations. Since the emulsions have an excellent pigment wetting capacity, they are particularly suitable as grinding resins for pigment pastes. The emulsions according to the invention are highly suitable as physically drying coating compositions, for example for coating wood substrates, metal substrates and mineral substrates. Coating compositions based on the emulsions prepared in more than one step dry rapidly, and the coatings resulting from them have high gloss and excellent water resistance and chemicals resistance. The coating compositions according to the invention are particularly suitable as wood paints, either as varnishes and clear lacquers or as paints for the industrial and building sectors.

The invention is described below in greater detail with reference to working examples: parts denote parts by weight, unless stated otherwise:

EXAMPLE 1

Preparation of a Two-Step Polymer Emulsion 640 parts of demineralized water, 9.7 parts of nonylphenyl ether reacted with 23 moles of ethylene oxide (UX Ultrapon NF 230 L from Ultraquimica, Emulsifier 1) and 0.3 part of formic acid are introduced into a reactor and warmed to 90° C. In a feed vessel, an emulsion is prepared from 229 parts of demineralized water, 38.3 parts of nonylphenol Na sulfate reacted with 23 moles of ethylene oxide (Disponil 25 S from Henkel, Emulsifier 2), 4.7 parts of sodium allyl ether sulfonate (Cops 1 from Alcolac), 427 parts of styrene, 258.4 parts of butyl acrylate, 163.2 parts of methylmethacrylate, 21.8 parts of acrylic acid and 13.2 parts of acrylamide. 10% of this emulsion are added to the mixture in the reactor. 0.9 parts of potassium peroxodisulfate in 36 parts of demineralized water is then added over the course of 5 minutes. An exothermic reaction commences. The reaction temperature is held between 90° C. and 93° C. 15 minutes after the addition of the potassium peroxodisulfate is complete, the remaining 90% of the emulsion are added over the course of 2 hours. At the same time, a solution of 3.5 parts of potassium peroxodisulfate in 140 parts of demineralized water are added over the course of 2 hours 15 minutes, the reaction temperature being kept at 89°–91° C. When the addition is complete, the mixture is kept at 90° C. for a further 15 minutes, and the addition of a second emulsion prepared from 172 parts of demineralized water, 8.2 parts of Emulsifier 2, 2.7 parts of Na allyl ether sulfonate (Cops 1 from Alcolac), 223 parts of styrene, 228 parts of butyl acrylate and 1 part of n-dodecylmercaptan is subsequently begun. At the same time, a solution of 2.6 parts of potassium peroxodisulfate in 65 parts of demineralized water is added over the course of 90 minutes. The emulsion is added over the course of 60 minutes, the reaction temperature being kept in the range from 89°–90° C. When the addition of the potassium peroxodisulfate solution is complete, the mixture is kept at 90° C. for a further 30 minutes and finally cooled. As soon as 50° C. has been reached, the mixture is neutralized by means of 18.2 parts of 25% strength ammonia solution and completed by means of 96 parts of demineralized water. The resultant emulsion has the following characteristic data:

Solids content 46.6%
pH 8.7
Viscosity (Brookfield viscometer) 2600 mPas (23° C.)
LD (440 nm) 42%

EXAMPLE 2

Analogously to Example 1, but with an additional 5.3 parts of allyl methacrylate in the first emulsion.

The emulsion has the following characteristic data:
Solids content 47.5%
PH 8.8
Viscosity (Brookfield viscometer) 4500 mPas (23° C.)
LD (440 nm) 46%

Use of the emulsion prepared in Example 1:

EXAMPLE 3

Water-Thinable Lacquer for Metal Surfaces 12.9 parts of the emulsion described in Example 1 are dispersed with 3.6 parts of butyl glycol, 0.2 parts of Collacral P polyurethane, a thicker from BASF AG, 12 parts of demineralized water, 2.8 parts of carbon black, 1.9 parts of strontium chromate and 2.5 parts of aluminum silicate in a dissolver. The resultant paste is subsequently ground in a glass bead mill. The formulation is completed with 46.5 parts of the emulsion prepared in Example 1, 4 parts of Dowanol PPH a solvent from propylene glycol phenolether DOW Chemicals, a thickener (Collacral P from BASF AG) and demineralized water.

Comparative Example 1

Water-Thinable Lacquer (Black) for Metal Surfaces 8.6 parts of a commercially available, short-oil, water-soluble alkyd resin made from ricinene fatty acids, neopentyl glycol hydroxypivalinate, trimethylolpropane, isophthalic acid and trimellitic anhydride and having an oil length of 30% and an acid number of 52–60 mg KOH/g and a solids content of 80% by weight in butyl glycol are dispersed in a dissolver with 2 parts of butyl glycol, dimethyl ethanolamine, 1.1 parts of Co octanoate, a flow-control additive (Collacral P from BASF AG), 3.0 parts of carbon black, 2.0 parts of strontium chromate, 2.7 parts of aluminum silicate and 14.3 parts of demineralized water. The resultant paste is ground in a glass beadmill. The mixture is completed with 50.7 parts of a commercially available primary acrylate dispersion (for example Acronal 290 D from BASF AG, Dowlatex DL 209 a primary dispersion from DOW Chemicals), Dowanol PPH (Dow chemicals), thickener (Collactral P from BASF AG) and demineralized water.

|  | Ex. 3 | Comparative Ex. 1 |
| --- | --- | --- |
| Drying at 25° C. | 15 min. | 30–35 min. |
| Gloss 60° angle | 50 | 50 |
| Water vapor resistance 40° C., 240 h | 1 | 2–3 |
| Salt-spray test 240 h, Zn phosphate | 1–2 | 2 |
| Resistance to brake fluid Immersion: 24 h, 25° C. | 1 | 3 |

Score scale:
1 = excellent
5 = unusable

Comparative Example 2

The emulsion described in Example 1 of U.S. Pat. No. 4,150,005 was prepared. A water-thinable lacquer was prepared from the resultant dispersion analogously to Example 1. The table below summarizes the results of Comparative Example 2 and Example 1:

|  | Ex. 3 | Comparative Ex. 2 |
| --- | --- | --- |
| Drying at 25° C. | 15 min. | 15 min. |
| Gloss 60° angle | 50 | 35 |
| Water vapor resistance 40° C., 240 h | 1 | 2 |
| Salt-spray test 240 h, Zn phosphate | 1–2 | 1–2 |
| Resistance to brake fluid Immersion: 24 h, 25° C. | 1 | 1 |

Score scale:
1 = excellent
5 = unusable

Comparison Example 3

Example 1 of EP-A-332 011 was repeated. The resultant emulsion is unsuitable as a grinding resin, since it coagulates immediately after pigment grinding.

EXAMPLE 4

Water-Thinnable Lacquer (Blue) for Metal Surfaces 23 parts of the emulsion prepared in Example 2 are dispersed in a dissolver with 5.1 parts of butyl glycol, 0.2 part of a flow-control additive, 0.2 part of Disperbyk anionic, a dispersant that is solution of an alkylolammonium salt of a higher molecular weight polycarboxylic acid (manufacturer: Byk-Chemie), 4.0 parts of demineralized water, 1.97 parts of titanium dioxide, 0.1 part of a red pigment (Paliogen L-4470 from BASF AG), 0.09 part of carbon black, 0.45 part of the blue pigment Heliogen blue 6901—LF from BASF AG, 0.64 part of the blue pigment Heliogen 7101 F from BASF AG, 5.0 parts of aluminum silicate, 1.4 parts of calcium molybdate and 0.6 part of zinc phosphate until complete homogeneity has been achieved. The mixture is subsequently ground in a sand mill, and the resultant pigment paste is completed with 9.3 parts of demineralized water, 4.0 parts of butyl glycol, 38.9 parts of the emulsion prepared in Example 2, 0.6 part of Texanol (manufacturer: Eastman Kodak) and demineralized water and thickener. The aqueous lacquer prepared has the following characteristics:

|  | Example 4 |
| --- | --- |
| Drying at 25° C. | 30 min. |
| Gloss 60° angle | 60 |
| Water vapor resistance 40° C., 240 h | 1 |
| Salt-spray test 240 h, Zn phosphate | 1 |
| Resistance to brake fluid Immersion: 24 h, 25° C. | 1 |

Score scale:
1 = excellent
5 = unusable

EXAMPLE 5

1716 parts of demineralized water, 34.5 parts of nonylphenyl ether—are reacted with 23 moles of ethylene oxide (UX Ultrapon NF 230 L from Ultrachimica,=emulsifier 1), 1.1 parts of formic acid, 4.85 parts of n-dodecyl mercaptan and 6.6 parts of Na allyl ether sulfonate (trade name Cops 1 from Alcolac) are introduced into a reactor and warmed to 90° C. In a feed vessel, an emulsion is prepared from 811 parts of demineralized water, 80 parts of nonylphenol 23 EO sodium sulfate (Disponil 25 S from Henkel, = emulsifer 2), 10.6 parts of Na allyl ether sulfate, 6.3 parts of dodecyl mercaptan, 1512 parts of styrene, 579.4 parts of methyl methacrylate, 917.4 parts of butyl acrylate, 77 parts of acrylic acid and 70.7 parts of acrylamide. 10% of this emulsion are added to the mixture in the reactor. 3.18 parts of potassium peroxodisulfite in 128 parts of demineralized water are then added over the course of 5 minutes. An exothermic reaction commences. The reaction temperature is held at between 90° C. and 93° C. 15 minutes after addition of the potassium peroxodisulfate solution is complete, the remaining 90% of the emulsion are added over the course of 2 hours, and simultaneously a solution of 12 parts of potassium peroxodisulfate in 483 parts of demineralized water is added over the course of 2 hours and 15 minutes, the reaction temperature being held in the range from 90° C. to 92° C. When the addition is complete, the mixture is kept at 90° C. for a further 15 minutes. The addition of a second emulsion prepared from 1110 parts of demineralized water, 55.1 parts of emulsifier 2, 792 parts of styrene, 811 parts of butyl acrylate, 9.7 parts of Na allyl ether sulfonate (Cops 1 from Alcolac) and 3.4 parts of n-dodecyl mercaptan is subsequently begun. At the same time, a solution of 6 parts potassium peroxodisulfate in 241 parts of demineralized water is added over the course of 90 minutes. The emulsion is added over the course of 60 minutes, the reaction temperature being kept at from 90° C. to 92° C. When the addition of the potassium peroxodisulfate solution is complete, the mixture is kept at 90° C. for a further 30 minutes and finally cooled. As soon as the temperature has dropped to 50° C., the mixture is neutralized by means of 60 parts of 25% strength ammonia solution and completed with 400 parts of demineralized water. The resulting emulsion has the following characteristic data:
Solids content: 48.4%
pH: 8.0
Viscosity (Brookfield type LVF, spindle 3):
6300 mPas (23° C.)
LD (440 nm): 30%

EXAMPLE 6

Water-Thinnable Lacquer (Yellow) for Metal Surfaces 28.2 parts of the emulsion prepared in Example 5 are dispersed in a dissolver with 4.95 parts of butyl glycol, 0.2 part of a flow-control additive, 0.2 part of Disperbyk (Byk-Chemie), 0.6 part of Luaktin, a solvent methylethyl ketoxime (BASF AG), 6.95 parts of demineralized water, 12.5 parts of Chromium yellow, 0.6 part of the red pigment Sicomin L 3130 S from BASF AG, 2.6 parts of barium sulfate, 2.6 parts of aluminum silicate and 1.5 parts of strontium chromate, and the mixture is subsequently ground in a sand mill. The mixture is then completed with 33.3 parts of the emulsion prepared in Example 5, 1 part of Texanol, a solvent having the formula 2,2,4-t-methyl-1,3-pentanediol mono-2-methylpropanate (Eastman Kodak), 0.1 part of sodium nitrite, demineralized water and a thickener. The lacquer prepared in this way has the following properties:

|  | Example 6 |
| --- | --- |
| Drying at 25° C. | 30 min. |
| Gloss 60° angle | 60 |
| Water vapor resistance 40° C., 240 h | 1 |
| Salt-spray test 240 h, Zn phosphate | 1 |
| Resistance to brake fluid Immersion: 24 h, 25° C. | 1 |

Score scale:
1 = excellent
5 = unusable

We claim:

1. Water-dilutable emulsion polymer prepared by multi-step emulsion polymerization of ethylenically unsaturated monomers in the aqueous phase in the presence of an emulsifier or a plurality of emulsifiers and in the presence of one or more free radical-forming initiators, comprising the steps of
1) polymerizing
   a1) 0.5 to 5.0% by weight, of ethylenically unsaturated monomers containing carboxyl groups,
   a2) (i) from 0.5 to 2.5% by weight, of olefinically unsaturated carboxamides,
   (ii) up to 7% by weight of hydroxyalkyl esters of α,β-unsaturated carboxylic acids
   where a total of from 1.0 to 8.0% by weight, of hydrophilic ionic and hydrophilic nonionic olefinically unsaturated monomers are employed, and
   (b) from 92.0 to 99.0% by weight, of further ethylenically unsaturated monomers which are copolymerizable with the above mentioned hydrophilic ethylenically unsaturated monomers and contain no further functional groups,
where the total amount of monomers in the first step is 100% by weight, and
2) polymerizing ethylenically unsaturated monomers containing no further functional groups in the presence of the emulsion polymer prepared in the first step,
characterized in that exclusively olefinically unsaturated monomers containing no further functional groups are polymerized in the second step of the emulsion polymerization, and the weight ratio between the monomers polymerized in the first step and the monomers polymerized in the second step is from 30–80%: 20–70% by weight.

2. Water-dilutable emulsion polymer according to claim 1, characterized in that up to 2.0% by weight of polyethylenically unsaturated monomers were used in the first step of the emulsion polymerization, the total amount of the monomers in the first polymerization step being 100% by weight.

3. Water-dilutable emulsion polymer according to claim 1, wherein component (a1) includes 1.0 to 3.0% by weight of ethylenically unsaturated monomers containing carboxyl groups,
component (a2) includes from 1.0 to 2.0% by weight, of olefinically unsaturated carboxamides, and component (b) includes from 95.0 to 98.0% by weight, of further ethylenically unsaturated monomers which are copolymerizable with the abovementioned hydrophilic ethylenically unsaturated monomers and contain no further functional groups.

4. Water-dilutable emulsion polymer according to claim 1, characterized in that mixtures of acrylic acid, acrylamide, styrene and methyl methacrylate were used in the first step of the emulsion polymerization and styrene and n-butyl acrylate were used in the second step of the emulsion polymerization.

5. Water-dilutable emulsion polymer according to claim 1, characterized in that the polymer is prepared by more than two polymerization steps, wherein the olefinically unsaturated monomers containing no further functional groups are polymerized in the step or steps following the second polymerization step.

6. Process for the preparation of a water-dilutable emulsion polymer comprising the steps of
1) polymerizing
   a1) 0.5 to 5.0% by weight, of ethylenically unsaturated monomers containing carboxyl groups,
   (a2) from 0.5 to 2.5% by weight, of olefinically unsaturated carboxamides,
where a total of from 1.0 to 8.0% by weight, of hydrophilic ionic and hydrophilic nonionic olefinically unsaturated monomers are employed, and
   (b) from 92.0 to 99.0% by weight, of further ethylenically unsaturated monomers which are copolymerizable with the abovementioned hydrophilic ethylenically unsaturated monomers and contain no further functional groups,
where the total amount of monomers in the first step is 100% by weight, and
2) polymerizing ethylenically unsaturated monomers containing no further functional groups in the presence of the emulsion polymer prepared in the first step,
characterized in that exclusively olefinically unsaturated monomers containing no further functional groups are polymerized in the second step of the emulsion polymerization, and the weight ratio between the monomers polymerized in the first step and the monomers polymerized in the second step is from 30–80%: 20–70% by weight.

7. The process of claim 6, wherein the emulsion polymerization is carried out at temperatures of from 20° C. to 100° C.

8. The process of claim 6, wherein the emulsion polymerization is carried out at temperatures of from 80° C. to 95° C.

9. Aqueous coating composition containing, as film-forming binder, the water-dilutable emulsion polymer according to claim 1, which is at least partially neutralized by means of a compound selected from the group consisting of ammonia, amines, and mixtures thereof.

10. The aqueous coating composition of claim 9, further comprising compounds selected from the group consisting of conventional fillers and modifiers, organic solvents, and pigments and mixtures thereof.

11. A binder in physically drying aqueous lacquers for metallic surfaces, wood and mineral substrates comprising the water-dilutable emulsion polymer according to claim 1.

* * * * *